March 22, 1960          K. ZWICK          2,929,300

MACHINE TOOL WITH AN ECCENTRIC TOOLHOLDER

Filed July 6, 1956          2 Sheets-Sheet 1

INVENTOR
KURT ZWICK, by John B. Brady
ATTORNEY

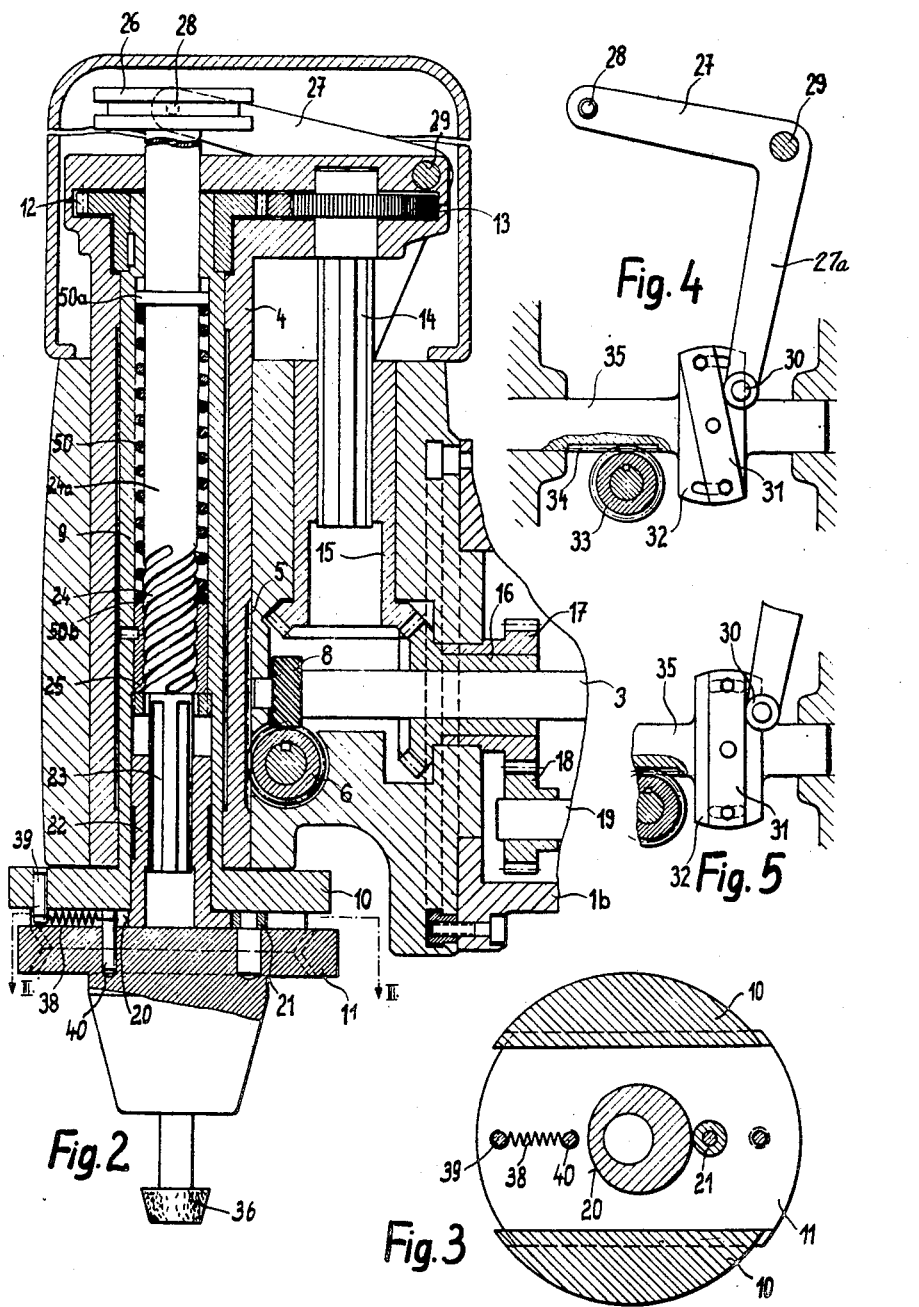

United States Patent Office 2,929,300
Patented Mar. 22, 1960

2,929,300

MACHINE TOOL WITH AN ECCENTRIC TOOLHOLDER

Kurt Zwick, Munich, Germany, assignor to Hans Deckel, Munich, Germany, and Friedrich W. Deckel, Zug, Switzerland Application July 6, 1956, Serial No. 596,310

Claims priority, application Germany July 12, 1955

2 Claims. (Cl. 90—14)

The present invention relates to a machine tool, such as a grinding, milling, or like machine with a toolholder transversely displaceable with respect to its axis of revolution, and mounting, for instance, a grinding wheel on a rotating spindle, for effecting the same from the main axis of revolution for the purpose of varying its radius of gyration.

It is already known that a toolholder can be offset from its axis by means of a pivotally movable crank lever. However, such forms of construction require toolholders of considerable structural height. To avoid this disadvantage and to provide a simple but compact form of construction the present invention effects the required displacement by means of a flat control cam revolving together with the toolholder which are urged together by resilient means.

Other features of this invention will appear from the following description of one form of construction of machine tool made in accordance with the invention and shown in the accompanying drawings in which Fig. 1 is a general view of a machine according to the invention fitted with a grinding tool;

Fig. 2 is a sectional view of the toolholder;

Fig. 3 is a section on the line III—III in Fig. 2 of the control cam with its return spring;

Figs. 4 and 5 are details of the control means for the operation of the cam, the control means being shown when set at an angle and when set vertically.

Figure 1:
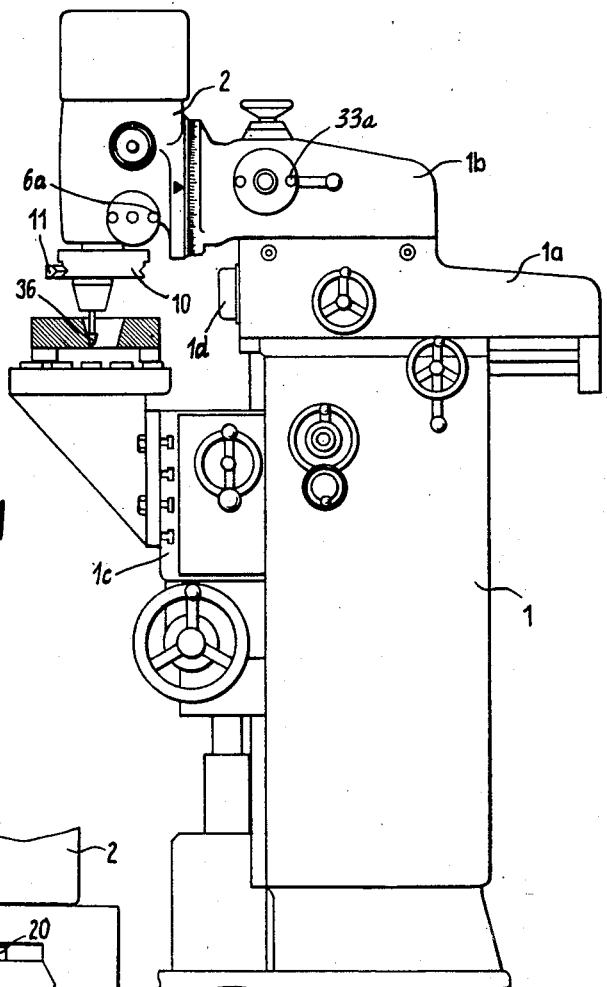

The machine tool shown in Fig. 1 is a milling machine of known construction. The pedestal 1 of the machine carries a table 1c which is vertically and horizontally adjustable. The main spindle 1d is mounted in a saddle 1a horizontally slidable on the top of the pedestal 1 of the machine. Adjustment of the table and of the saddle may be effected by hand (by means of handwheels) or by automatic means disposed in the pedestal and connected through appropriate transmission and gear elements with the respective feeds. This form of construction and general arrangement of the drive elements is already known and requires no further description. The arrangement may be one as described in U.S. patent application, Serial No. 553,609, filed December 16, 1955.

Figure 6:
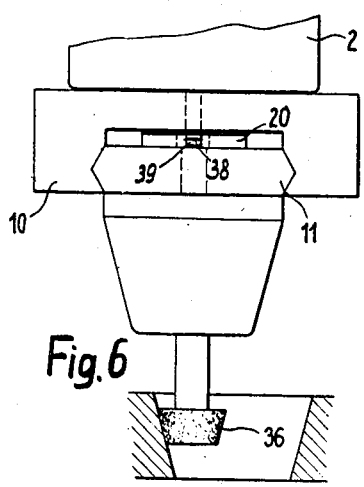
Figs. 6 and 7 are details of the toolholder carrying a taper edge and a cylindrical grinding tool respectively.
Figure 7:
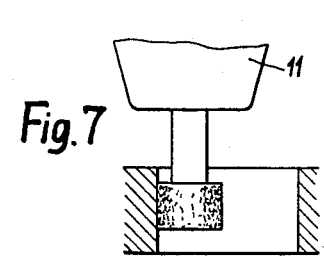

The saddle 1a supports a casing 1b held and secured in suitable mountings. A milling head 2 which carries the toolholder, can be tilted about the axis of a horizontal shaft 3 (Fig. 2) and adjustably clamped at any desired angle. The shaft 3 is disposed inside the casing 1b and connects with a gearing (not shown) for the transmission of an automatic feed motion. Inside the milling head there is provided a sleeve 4 which can be moved longitudinally. The axial movement of the sleeve 4 is effected by an automatic feed mechanism in the machine, and can be raised and lowered by means of a helically cut rack 5 and a cooperating gear wheel 6 (which in turn meshes with a helical gear wheel 8 on the shaft 3). If desired, the gear wheel 6 may also be operated manually by the manipulation of a control 6a (Fig. 1) which may be associated with a scale and an index mark. Rotatably held within the sleeve 4 is an inner sleeve 9 the lower end of which carries a block 10 for mounting a toolholder 11 which takes the form of a slide (Fig. 6), the inner sleeve 9 thus forming the spindle through which the toolholder is rotatably driven.

Secured to the upper end of the rotatable inner sleeve 9 is a driving gear 12 engaged by a pinion 13. This latter pinion 13 is integral with a splined shaft 14 which can be axially displaced in the hollow hub of a bevel wheel 15. The bevel wheel 15 meshes with another bevel wheel 16 which is rotatably mounted on the shaft 3, and which is itself connected with a gear wheel 17 driven by a gear wheel 18 on a shaft 19. The shaft 19 is driven by the prime mover of the machine, for instance through the transmission train which drives the main spindle 1d in the saddle 1a.

Rotary motion is therefore imparted to the block 10 through the gear train formed by the gear wheels 12, 13, 15, 16, 18 by the prime mover of the machine. The gear wheels 12 and 13 are mounted in the upper part of the sleeve 4.

For the purpose of displacing the toolholder 11 radially, i.e. transversely with respect to the axis of revolution of parts 9 and 10, in other words for varying the radius of the gyrating or planetary motion of the tool the present invention provides a flat cam element 20 revolving together with the toolholder 11 which is urged into contact therewith by spring means, the cam being disposed in a plane normal to the axis of revolution of the toolholder.

The primary advantage offered by this arrangement according to the invention lies in that the flat cam requires little space axially of the toolholder so that the structural height of the unit can be reduced to within very narrow limits. In addition to this, the arrangement according to the invention affords the further advantage of providing a wide range of angular rotatability of the cam, extending in practice through as much as 360°. Unavoidable tolerances in machining, clearances etc. are therefore distributed over a wide range, and the accuracy of adjustment and machining is therefore considerably enhanced.

It is preferred to give the cam element the contour of an Archimedean spiral, for reasons which will be hereinafter more particularly explained. However, the cam might also be an eccentric, but in this case the kinematic chain would require the inclusion of a correcting element to take care of the sine-law motion such a cam would create. The sine correction might be provided, for instance, by the cam face of a master cam which will be referred to again in the following further description.

The cam element 20 peripherally surrounds the end of a bushing 22 rotatably mounted within the inner sleeve 9. The splined end 23 of a spindle 24a engages the inside of the bushing 22, the spindle 24a being coaxial with the cam element 20 and axially displaceable. The spindle 24a is provided with a coarse-pitch thread 24 which engages in a nut 25, which is rigidly held inside the inner sleeve 9. Consequently, when the spindle 24a is axially displaced it is at the same time forced to perform a rotary movement in relation to the inner sleeve 9. A grooved flange 26 at the upper end of the spindle 24a is engaged by the crosshead pins 28 of a bifurcated crank lever 27 which is fulcrumed on a pin 29 mounted in the head of the sleeve 4. The other arm 27a of crank lever 27 carries a roller 30 which makes contact with the edge of a master cam 31. To maintain contact between the roller 30 and the master cam 31, a spring 50 is arranged around the spindle 24a with one end bearing against a collar 50a on the spindle, and the other end against a surface 50b of the nut 25. The master cam 31 may have an arbitrarily shaped contour which, according to requirements, may be linear, cambered, or of some other shape. The master cam 31 in the milling head is capable of being set at an angle on a plate 32 and is manually shiftable through the medium of a pinion 33 which meshes with a rack 34 on a shift bar 35 which carries the plate 32. For setting the angularity of the master cam 31 on the bar 35 there is provided on the milling head an appropriate control (not shown) by means of which the setting can be effected with reference to a scale and an index mark.

If the control cam 20 has the contour of an Archimedean spiral, a shape which has already been mentioned as being advantageous for the purpose in view, the kinematic relationship between the transverse displacement of the toolholder and the displacement of the master cam 31 by the lengthwise movement of the bar 35 will be of a linear nature. This linear relationship will hold exactly so long as the master cam 31 is straight-edged itself and forms the same angle with the plane of the groove in flange 26 as that enclosed by the arms of the crank lever 27. In the cases illustrated in Figs. 1 and 5 this is a right angle. In other words, a linear scale may be provided for setting the shift of master cam 31 and this will then give a direct reading of the displacement of the toolholder. A linear scale may therefore be associated with the control wheel 33a (Fig. 1) which serves to operate pinion 33 and to set the shift bar 35 with reference to an index mark. If the master cam 31 is set at an angle as shown in Fig. 4 there will be a slight sine-law distortion.

Of course, the control cam need not necessarily be an Archimedean spiral and may take the form of an ordinary eccentric. However in this case the relationship between the toolholder movement and the master cam shift will not be of a linear nature.

It will be readily understood from the foregoing that the toolholder 11 performs a rotary movement (through the sleeve 9) and an up and down movement (through the sleeve 4). The crank lever 27 also moves up and down within the sleeve 4 so that its roller 30 will run up and down the master cam 31 (Fig. 4) which does not itself move up and down. When the master cam 31 is set at an angle the crank lever 27 is made to perform a rocking movement with up and down movement and the action of its bifurcated end through pins 28 on the grooved flange 26 therefore imparts an additional working movement to spindle 24a. As has been explained such an additional movement will at the same time impress a rotary movement on spindle 24a. In other words, spindle 24a will perform a screw motion. However, the sliding splined end 23 of the spindle 24a transmits only the radial component of this screw motion to the bushing 22 which therefore performs only the rotary movement and turns the control cam 20 in relation to the slideway 10 so that the toolholder 11 and the tool attached thereto, for instance a grinding wheel 36, will perform a transverse motion. An additional transverse motion created by the angled master cam 31 and the control cam 20 is therefore superimposed upon the rotational movement and vertical reciprocation of the toolholder 11. The additional axial displacement of the spindle 24a is not transmitted to the sleeve 4 because this additional displacement is merely a relative motion between the spindle 29a and the bushing 22. Consequently, when the sleeve 4 is moved downwards by the tool feed, the above described train of elements 31, 30, 27, 24, 23, 20 causes a transverse movement of the toolholder 11 so that the radius of gyration steadily decreases. It is therefore possible to grind a tapering hole with a tapered grinding wheel 56, the angle of taper being controlled by the angular setting of the master cam 31. If the slight sine-law distortion produced by the angularity of the master cam 31 is not corrected the surfaces of the taper bore will be slightly convex. However, the fault can be easily remedied by giving the master cam an appropriate contour. In order to be able to adapt the machine to any desired kind of operation, several master cams 31 may be provided which may be fixed interchangeably on plate 32 and thus permit to select the necessary correction.

On the other hand, if the master cam 31 is placed in an exactly vertical position (Fig. 5) no transverse movement will be imparted to the toolholder 11 in addition to its rotational and vertical reciprocating motions so that in this case a cylindrical bore can be machined.

The means that have been described therefore permit, by the selection of suitable contours for the cam element 20 and the master cam 31, to impress any desired motion upon the toolholder with the help of the threads 24 and thus to machine differently shaped surfaces on the work.

Between the toolholder 11 and the block 10 there is a return spring 38 anchored to appropriate pins 39 and 40.

Suitable driving means such as a pneumatic turbine, for driving the spindle of the grinding wheel 36 are disposed in or on the toolholder 11.

While I have described my invention in one of its preferred embodiments, I realize that modifications may be made and I wish that it be understood that no limitations upon my invention are intended other than may be imposed by the scope of the appended claims.

What I claim is:

1. A machine tool comprising a frame, a hollow driving spindle terminating in a flat flange extending in a plane normal to the axis of the spindle, a rotating toolholder transversely displaceable in a slot means within said flange with respect to the axis of said driving spindle, a flat control cam within said slot means and extending in a plane normal to the axis of said spindle and parallel with the plane of said flat flange, said cam also having a tubular portion extending into the flange end of said spindle, resilient means connected to said toolholder and said flange for biasing said toolholder having a cam follower into surface contact with said cam, said resilient means acting in the plane of the cam and normal to the axis of the driving spindle of the toolholder, and a member, arranged co-axially within the hollow driving spindle, said member having a coarsely pitched threaded portion engaged with a threaded element secured to the driving spindle, said member engaging said control cam tubular portion and being axially movable with respect to said control portion, whereby axial movement of the member relative to the driving spindle produces relative rotation between the member and the driving spindle and thereby a rotation of said cam relative to the toolholder so as to transversely displace the rotating toolholder within said slot means.

2. A machine tool comprising a frame, a hollow driving spindle terminating in a flat flange extending in a plane normal to the axis of the spindle, a rotating toolholder transversely displaceable in a slot means within said flange with respect to the axis of said driving spindle, a flat control cam within said slot means and extending in a plane normal to the axis of said spindle and parallel with the plane of said flat flange, said cam also having a tubular portion extending into the flange end of said spindle, resilient means connected to said toolholder and said flange for biasing said toolholder having a cam follower into surface contact with said cam, said resilient means acting in the plane of the cam and normal to the axis of the driving spindle of the toolholder, and a member, arranged co-axially within the hollow driving spindle, said member having a screw-thread engaged with a screw-threaded element secured to the driving spindle, said member engaging said control cam tubular portion and being axially movable with respect to said control portion whereby axial movement of the member relative to the driving spindle produces relative rotation between the member and the driving spindle and thereby a rotation of said cam relative to the toolholder so as to transversely displace the rotating toolholder within said slot means, a master cam element associated with said member and a two-arm crank lever pivoted with respect to said frame, one arm of said crank lever engaging said member and the other arm of said crank lever engaging said master cam element for displacing said member upwardly and downwardly when said driving spindle is fed axially.

References Cited in the file of this patent

UNITED STATES PATENTS

| | | |
|---|---|---|
| 1,848,108 | Copland | Mar. 8, 1932 |
| 1,941,259 | Green | Dec. 26, 1933 |
| 2,039,646 | Hoisington et al. | May 5, 1936 |

FOREIGN PATENTS

| | | |
|---|---|---|
| 284,532 | Switzerland | Nov. 17, 1952 |
| 1,108,545 | France | Apr. 31, 1955 |